United States Patent [19]

Mills

[11] 4,329,853
[45] May 18, 1982

[54] MIX OVER-RUN DEVICE

[76] Inventor: John W. Mills, 301 S. Idaho, Columbus, Kans. 66725

[21] Appl. No.: 264,349

[22] Filed: May 18, 1981

Related U.S. Application Data

[63] Continuation of Ser. No. 45,130, Jun. 20, 1979, abandoned.

[51] Int. Cl.³ .............................................. A23G 9/00
[52] U.S. Cl. ...................................... 62/308; 62/342; 137/890; 239/403; 366/163
[58] Field of Search ........................ 62/342, 343, 308; 137/890, 896; 239/403, 405; 222/190; 366/163, 164, 178; 261/DIG. 16, 76

[56] References Cited

U.S. PATENT DOCUMENTS

| | | | |
|---|---|---|---|
| 1,645,614 | 10/1927 | Monahan | 366/164 |
| 2,149,115 | 2/1939 | De Foe et al. | 239/405 |
| 2,755,134 | 7/1956 | Eck et al. | 239/405 X |
| 3,279,705 | 10/1966 | Stiefel | 239/403 X |
| 3,517,881 | 6/1970 | Kohlbeck et al. | 236/13 |
| 3,898,858 | 8/1975 | Erickson | 62/135 |
| 4,045,976 | 9/1977 | Mills | 62/308 |
| 4,221,117 | 9/1980 | Martineau | 62/342 X |

Primary Examiner—William E. Tapolcai, Jr.
Attorney, Agent, or Firm—Edward L. Brown, Jr.

[57] ABSTRACT

This invention pertains to machines for freezing and dispensing a confectionery product, particularly soft ice cream and milk shakes. The invention is particularly addressed to an improved mix over-run control for controlling the flow of air and liquid product into the freezing chamber by directing the incoming fluid mix from a reservoir into a vortex chamber which causes the fluid mix to flow down the side walls of a communicating line with an open air passage in the center therefor for assuring the proper over-run or percentage of air in the resultant confectionery product.

5 Claims, 6 Drawing Figures

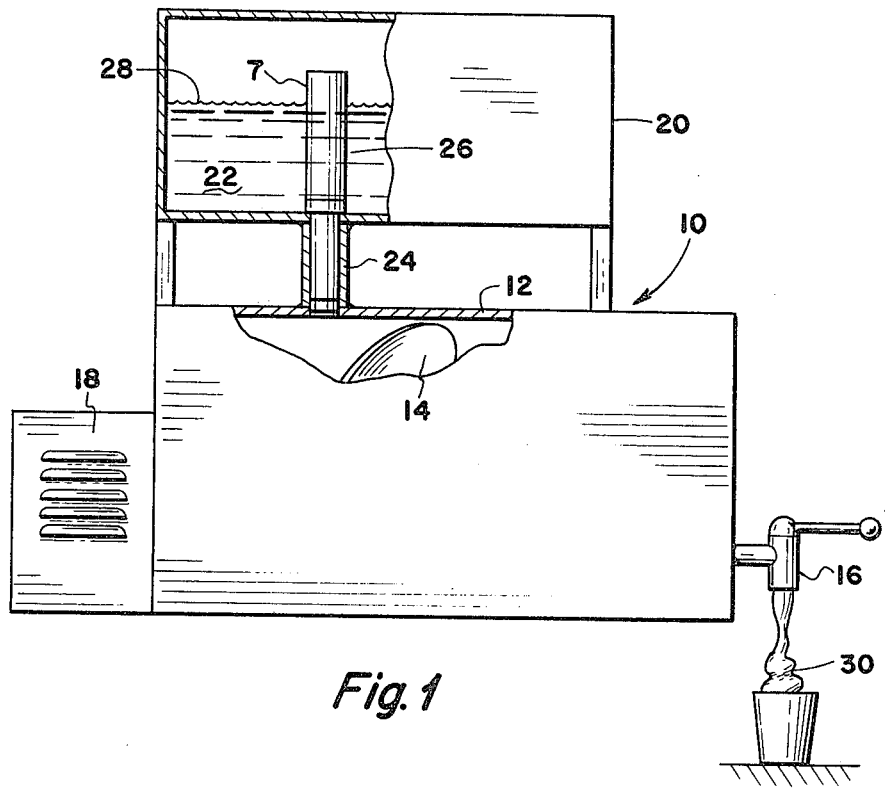
Fig. 1
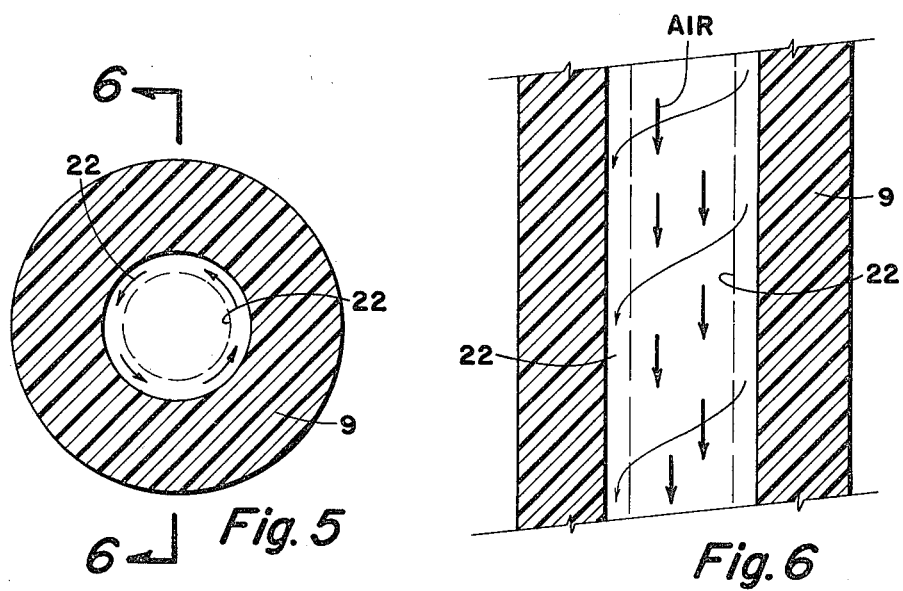
Fig. 5
Fig. 6

MIX OVER-RUN DEVICE

This application is a continuation of application Ser. No. 045,130 filed June 20, 1979 for MIX OVER-RUN SYSTEM, now abandoned.

This invention pertains to machines for freezing and dispensing a confectionery product, particularly soft ice cream and milk shakes; the machine consisting in part of a freezing chamber, a liquid product reservoir located above the freezing chamber, and a tubular communicating line between the liquid product and the freezing chamber. The invention is particularly addressed to an improved mix over-run control for controlling the flow of air and liquid product through the tubular communicating line, thereby assuring the proper over-run or percentage of air in the resultant confectionery product.

BACKGROUND OF THE INVENTION

Machines for freezing and dispensing a soft confectionery product such as frozen custard, milk shakes, or soft ice cream generally include a freezing cylinder housing a rotary dasher. Positioned above the freezing chamber is a reservoir containing a suitable mix in the form of a liquid product which, when subsequently frozen under proper conditions, will yield the desired flavor and texture. The dasher in the freezing chamber acts to whip air into the mix as well as circulate the product within the freezing chamber so as to assure reasonably uniform temperature, texture, and the like.

The freezing chamber and liquid product reservoir are typically connected in some manner so as to permit a suitable amount of new liquid product to move from the reservoir to the freezing chamber at the same time as some frozen product is being dispensed from the freezing cylinder. In the machines to which this invention applies, the freezing chamber and the liquid product reservoir are typically connected by an open tubular communicating line extending between the two. An element may be positioned near the liquid product reservoir end of the tubular communicating line to control the amount of mix and air which is drawn into the freezing chamber. A common failing of machines of this type has been the inability of the machines to obtain the proper "over-run" in the dispensed product. The term "over-run" refers to the amount of air by volume which is added to the liquid mix.

When the frozen product is not being dispensed from the freezing cylinder, the machine must periodically cycle on and off so as to correctly maintain the temperature and texture of the frozen product in the freezing chamber. When the machines cycles on, the beater or dasher also runs in order to keep the frozen product firm enough so it can be dispensed when needed. As the machine remains in this "standby" condition for any extended period of time, the resultant frozen product, when finally dispensed, will not contain as much air as it should, and as a result will lack proper taste, not stand up in a cone, and often becomes grainy. Soft ice cream normally dispensed from an apparatus of this type is most desirably served at 17° F. to 20° F. with a 3 to 5% butterfat mix content and an "over-run" of at least 50%. Typically, however, a gravity-fed machine of this type not utilizing the advancement of this invention will average significantly below 50% over-run. Solutions have been suggested to this problem of maintaining the "over-run" in the frozen product, including the use of elaborate pumps for introducing pressurized or compressed air into the freezing chamber. Examples of machines using an external air pressurizing device are to be found in U.S. Pat. No. 3,196,633, U.S. Pat. No. 3,147,601, and U.S. Pat. No. 2,565,121. The disadvantage of the addition of such elaborate pumping schemes is the increased energy which is required to run the apparatus, problems in mechanical failure, valuable time consumed in cleaning, as well as the non-convertibility of most older types of gravity-fed machines.

Other solutions have involved the use of systems for metering the introduction of liquid product into the freezing chamber based upon an electromagnetic interaction with the dispensing valve of the freezing chamber. Examples of machines using devices of this type are to be found in U.S. Pat. No. 2,737,024, U.S. Pat. No. 3,196,637, U.S. Pat. No. 3,304,737, and U.S. Pat. No. 3,866,801. Again, these devices have the disadvantage of an increased energy consumption, although much smaller than the elaborate pumping schemes previously referred to. Many of the devices require substantial modification of existing machines, and as a result, many older type gravity-fed machines are, again, not convertible to this type of product manipulation.

SUMMARY OF THE INVENTION

The invention generally comprises an improved mix over-run for controlling the flow of air and liquid product through the tubular communicating line present between the liquid product reservoir and the freezing chamber of a soft ice cream or milk shake machine. The mix over-run device comprises a lower tubular member removably received within the communicating line. A central passageway through the tubular member intersects a chamber shaped into a vortex. The vortex chamber has openings into the liquid product reservoir. As the liquid mix tangentially enters the vortex chamber and strikes the vortex wall, the mix will spin around the wall leaving an air path in the middle of the vortex. The swirling fluid continues down the walls of the central passageway into the freezing chamber while maintaining an open air path in the center thereof. The degree of angle of the vortex wall, the size of the vortex, the area of the vortex where the mix enters to stroke the vortex wall, along with the diameter and length and number of apertures entering the vortex determine the amount of liquid mix and air that enters the apparatus freezing cylinder at any level of liquid mix in the apparatus liquid mix reservoir. The higher levels of mix in the reservoir cause the mix to enter and spin around the vortex faster, which keeps the mix in suspension longer and allows the mix and air to enter into the apparatus freezing cylinder in the same ratio as at lower levels of mix in the mix reservoir. The apertures in the vortex chamber leading to the liquid product reservoir are located in the wall of the lower tubular member.

A mix over-run device, according to this invention, further comprises an upper tubular member connected to the vortex chamber which extends upward to a point above a maximum anticipated level of liquid product in the liquid product reservoir. The lower end of the upper tubular member extends downward inside the lower tubular member, immediately above the top of the vortex and far enough into the upper area of the lower tubular assembly to seal itself by means of an O-ring.

This invention has the advantage of very simply and more reliably controlling the consistency and over-run of frozen and semi-frozen confectionery products than previously thought possible. This advantage is experienced by reliably controlling the head pressure exerted from the mix reservoir and permits the liquid product to enter the lower tubular communicating line between the liquid product reservoir and the freezing chamber. As there are hundreds of liquid confectionery products being used for freezing soft-serve ice cream and milk shake confections, there is a wide range of viscosity of thicknesses of the liquid mixes. A unique feature of the mix over-run device of the present invention is its ability to control the rate of flow of liquid mix whether thick or thin while providing an open air passage so that the "over-run" remains fairly constant. This invention has the additional advantage of low initial cost and easy adaptability to existing equipment without modification. Other features and advantages of the invention will become apparent upon consideration of the following discussion of the accompanying figures illustrating certain preferred embodiments of the invention.

BRIEF DESCRIPTION OF THE DRAWINGS

FIG. 1 is a side elevational view of a soft ice cream machine with portions shown in section to illustrate the location of the mix over-run device of the present invention;

FIG. 5 is a lateral section taken along lines 5—5 of FIG. 2; and

FIG. 6 is a partial longitudinal section illustrating the liquid mix and air flow paths through the over-run device.

DESCRIPTION OF THE PREFERRED EMBODIMENTS

Figure 2:
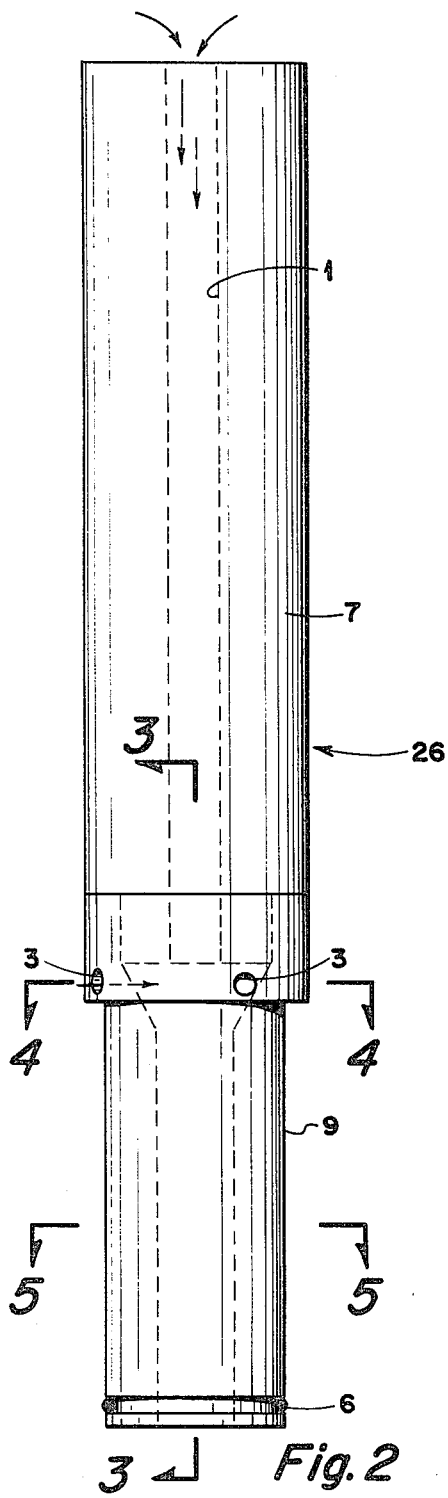
FIG. 2 is a side elevational view of the mix over-run device in detail.

An apparatus or machine for freezing and dispensing confectionery products, such as frozen soft ice cream, milk shakes, and the like, is illustrated by reference numeral 10 in FIG. 1. The apparatus 10 includes a freezing chamber 12 within which the confectionery product is frozen and stored until dispensed through nozzle 16 for consumption. Within the freezing chamber 12 is a beater or dasher 14 which mixes the frozen confectionery product with air to insure proper texture and consistency, all of which is well-known in the prior art and therefore not shown in detail. The temperature of the product in chamber 12 is maintained by appropriate refrigeration means 18. The apparatus 10 also includes a liquid mix reservoir 20 located above the freezing chamber 12 in which the mix or liquid product 22 is stored in a liquid state. A tubular communicating line 24 extends between the reservoir 20 and the freezing chamber 12, and it is through this tubular line 24 that the liquid product 22 is metered with the aid of an over-run control device 26, according to the present invention. The liquid product 22 contained within the reservoir 20 will generally have a maximum level indicated by the line 28 and a minimum level approximate the bottom of the reservoir. As the frozen confectionery product 30 is dispensed through spigot 16, a slight vacuum is created in the freezing chamber 12 causing a replacement volume of air and mix to enter the freezing chamber 12 by way of device 26. While head pressure basically causes the mix to enter freezing chamber 12, air is induced in the freezing chamber by the slight vacuum created by dispensing the product from spigot 16.

Figure 4:
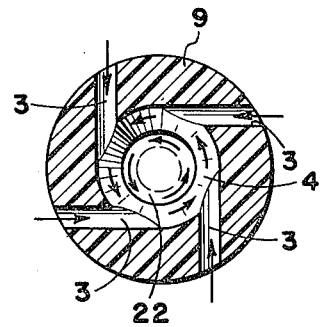
FIG. 4 is a lateral section taken along lines 4—4 of FIG. 2.
Figure 3:
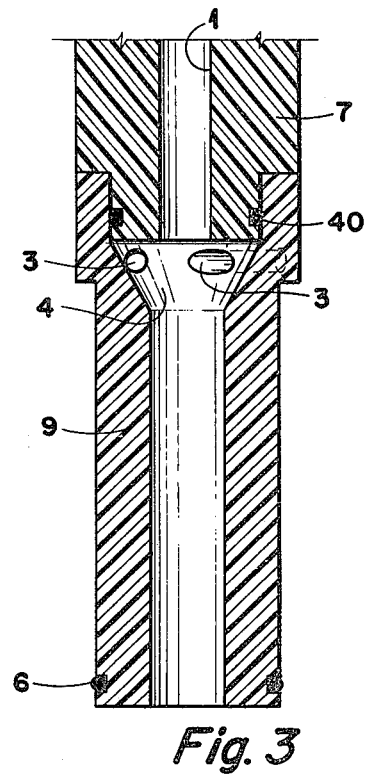
FIG. 3 is a partial longitudinal section of the mix over-run device.

A detailed embodiment of the mix over-run device 26 is illustrated in FIGS. 2, 3 and 4. Device 26 comprises a lower tubular member 9 which is adapted to be removably received within a tubular communicating line 24. Positioned at the lower end of member 9 is an O-ring 6 located in a companion groove for sealing member 9 in line 24. Member 9 may have various diameters and O-ring sizes to accommodate the tubular communicating line 24 of the various makes and models of freezing machines 10. The lower tubular member 9 is sealingly connected to the upper tubular member 7 by means of an O-ring 40, located in a groove in the upper tubular member 7. The upper member 7 has a central passageway 1 for the entry of air, running its entire length.

A plurality of laterally positioned apertures 3 are embodied in the lower tubular member 9, as best seen in FIG. 4, which tangentially intersect a vortex chamber 15. The side wall 4 of vortex chamber 15 is tapered inwardly as it extends downwardly, intersecting central passageway 13 in lower tubular member 9.

OPERATION

When the spigot 16 is opened to draw frozen product 30, liquid product 22 will flow from the liquid product reservoir 20 into the lower tubular member 9 through apertures 3. The liquid product 22 will stroke the wall 4 of vortex chamber 15 and will swirl in a counter-clockwise direction. As the angular velocity decreases, the swirling fluid flows downwardly into passageway 13 remaining in contact with the side walls of passageway 13. The swirling fluid 22, as seen in FIGS. 5 and 6, continues down passageway 13 with an open air passage in the center thereof. This air passage remains open, providing air to the freezing chamber as long as there is vortex flow through apertures 3. At high reservoir levels, the flow rate through the apertures 3 will increase due to the increased head pressure of the standing fluid 22. Increased flow rates through apertures 3 cause the angular velocity of the fluid in the vortex chamber 15 to increase and retain the fluids longer in the chamber before they flow down the side walls of passageway 13. The centrifugal force of the swirling fluid in chamber 15 also has a tendency to restrict the incoming jets of fluid through apertures 3. In effect, as the velocity of flow increases through apertures 3, the increased speed of the swirling fluid has a throttling effect on the incoming fluid. This throttling effect limits the rate of fluid flowing into the freezing chamber 12 so as to not exceed the volume of ice cream flowing out of chamber 12 through spigot 16. If the volume of fluid flowing into chamber 12 exceeds the outflow, the over-run device 26 will flood and passageway 13 will fill with fluid and no air will enter freezing chamber 12.

When thinner mixes having less viscosity are used, they will flow with an increased velocity and increased flow rate which will have a tendency to flood. However, the increased velocity in the vortex chamber 15 will throttle the flow rate into the freezing chamber 12. The result will be that the flow rate out of the device 26 will remain constant as will the over-run or percent of air mixed into the ice cream.

The single design "over-run" device of the present invention will function properly with wide variations in mix viscosity and maintain a high and fairly constant percent of "over-run" or air in the ice cream product.

"Over-run" will vary somewhat as to the draw rate of the machine's spigot 16, since the rate of withdrawal of ice cream from the machine affects the amount of slight vacuum pull exerted on the device 26.

There is an optimum size for apertures 3 for handling thicker mixes and the angle of the side wall 4 of the vortex chamber can be varied widely to tailor the "over-run" device 26 to certain characteristics. For example, if it is desired to increase the amount of flow into the freezing chamber, the angle of the side wall 4 from the horizontal can be increased.

Although the invention has been described in considerable detail with reference to certain preferred embodiments thereof, it will be understood that variations and modifications can be effected within the spirit and scope of the invention as described above and as defined in the appended claims.

I claim:

1. In an apparatus for freezing and dispensing a soft confectionery product, the apparatus including a freezing and mixing chamber, a liquid product reservoir and a communicating line between the reservoir and the freezing chamber; the improvement comprising a mix over-run control device removably positioned in said communicating line for supplying a proper proportion of air and liquid to the freezing chamber, the device comprising:

upper and lower tubular members removably joined together in axial alignment with a common central passageway, passing through both members, the lower member being substantially positioned within said communicating line with the upper end of the upper member extending above the maximum fluid level in the reservoir, so as to provide air to the passageway at all reservoir levels;

a vortex chamber concentrically positioned within the central passageway; and a plurality of lateral apertures passing through one of said tubular members tangentially joining the vortex chamber with the reservoir whereby fluid entering the apertures from the reservoir causes a vortex flow of fluid in the chamber and down the sides of the central passageway in the lower tubular member with an open air passage in the center thereof, the velocity of fluid flow in the chamber will vary according to the head of fluid in the reservoir with the fluid flow rate into the freezing chamber remaining substantially constant at varying reservoir levels.

2. An over-run control device as set forth in claim 1 wherein the vortex chamber is located approximate the juncture between the upper and lower tubular members and has a diameter substantially greater than the central passageway.

3. An over-run control device as set forth in claim 1 wherein the vortex chamber has a diameter greater than the central passageway with the side walls converging downwardly into the central passageway in the lower tubular member.

4. An over-run control device as set forth in claim 1 wherein the central passageway in the lower tubular member is larger than the passageway in the upper tubular member.

5. An over-run control device as set forth in claim 1 wherein the vortex chamber and apertures are located in the lower tubular member and with the device in place in the communicating line, the lower member partially extends into the reservoir with the apertures communicating with the bottom of the reservoir.

* * * * *